(12) United States Patent
Fujiki et al.

(10) Patent No.: US 7,063,265 B2
(45) Date of Patent: Jun. 20, 2006

(54) BAGGAGE TAG AND METHOD FOR USING BAGGAGE TAG

(75) Inventors: Yasutake Fujiki, Tokyo (JP); Yasuji Koga, Soka (JP)

(73) Assignee: Oji Paper Co., Ltd., Tokyo (JP)

( * ) Notice: Subject to any disclaimer, the term of this patent is extended or adjusted under 35 U.S.C. 154(b) by 0 days.

(21) Appl. No.: 10/488,168

(22) PCT Filed: Aug. 29, 2002

(86) PCT No.: PCT/JP02/08725

§ 371 (c)(1),
(2), (4) Date: Mar. 1, 2004

(87) PCT Pub. No.: WO03/027950

PCT Pub. Date: Apr. 3, 2003

(65) Prior Publication Data

US 2004/0262404 A1    Dec. 30, 2004

(30) Foreign Application Priority Data

Sep. 3, 2001  (JP)  .................. P 2001-266349

(51) Int. Cl.
*G06K 19/02*  (2006.01)

(52) U.S. Cl. .................. 235/488; 235/492; 235/489

(58) Field of Classification Search ........ 235/487–492, 235/381–384; 428/217, 130, 694 PR
See application file for complete search history.

(56) References Cited

U.S. PATENT DOCUMENTS

| | | | | |
|---|---|---|---|---|
| 5,318,817 A * | 6/1994 | Ohno et al. | ................. | 428/41.3 |
| 5,395,667 A * | 3/1995 | Ohno et al. | ................. | 428/41.3 |
| 5,495,250 A * | 2/1996 | Ghaem et al. | ................. | 342/51 |
| 5,670,015 A * | 9/1997 | Finestone et al. | ........... | 156/549 |
| 5,670,225 A * | 9/1997 | Yamanaka et al. | ......... | 428/40.1 |
| 6,265,977 B1 * | 7/2001 | Vega et al. | ............... | 340/572.7 |
| 6,287,684 B1 * | 9/2001 | Yamanaka et al. | .......... | 428/343 |
| 6,290,138 B1 | 9/2001 | Ohno et al. | | |
| 6,501,440 B1 * | 12/2002 | Matsushita et al. | ......... | 343/895 |
| 6,576,325 B1 * | 6/2003 | Yamanaka et al. | .......... | 156/229 |

FOREIGN PATENT DOCUMENTS

| | | |
|---|---|---|
| EP | 0903687 A2 | 3/1999 |
| JP | 405016976 A * | 1/1993 |
| JP | 405051052 * | 3/1993 |
| JP | 6-243358 | 9/1994 |
| JP | 10-265744 A | 10/1998 |
| JP | 11-91274 A | 4/1999 |
| JP | 2000-19965 A | 1/2000 |
| JP | 2000-338874 | 12/2000 |

OTHER PUBLICATIONS

Edwin Deagle (JP 6-243358), Luggage Tag for High Frequency Identification, Feb. 9, 1994, Patent Abstracts of Japan.*
International Search Report for PCT/JP02/08725 mailed Jan. 28, 2003, ISA/JPO.

* cited by examiner

*Primary Examiner*—Michael G. Lee
*Assistant Examiner*—Kimberly D. Nguyen
(74) *Attorney, Agent, or Firm*—Harness, Dickey & Pierce, P.L.C.

(57) ABSTRACT

A baggage tag in which a recording layer is formed on one side of a laminate, a circuit element is placed on the side opposite to the recording layer of the laminate, the laminate is a laminate of a paper sheet and a plastic film. The Clark degree of the laminate including the record layer in the recording direction, prescribed by JIS P8143, is 50 to 200. Therefore, the baggage tag is substantially free from problems due to defective printing and is free from the danger that the circuit element will come off and the baggage tag will be pulled off during the transport of the baggage.

12 Claims, 2 Drawing Sheets

BAGGAGE TAG AND METHOD FOR USING BAGGAGE TAG

TECHNICAL FIELD

The present invention relates to a baggage tag provided with a circuit element.

The present invention is based on a patent application in Japan (Japanese Patent Application No. 2001-266349), the content of which is incorporated herein by reference.

BACKGROUND ART

An automated identification control system for baggage using bar codes is conventionally employed for handling baggage, such as airline baggage. A bar code is a computerized arranged state of images (bars), and it is possible to read the information contained therein using a special bar code reader. Accordingly, a tag provided with a bar code in which information, such as owner, destination, and airline flight number, is recorded is attached to airline baggage to control transportation of the airline baggage.

However, it is not possible to record a large amount of information and to alter the information recorded in a bar code. Also, it is easy to make fake bar codes. For that reason, a system called radio frequency identification (RFID) has recently attracted attention.

In RFID, a semiconductor (IC) chip, a flat antenna of a loop shape which is electrically connected to the IC chip and transmits/receives information, and an IC module provided with a condenser (hereinafter called a circuit element) are employed. Note that in the RFID system currently used, information is recorded using both the circuit element and a conventional bar code.

However, there is a problem in the production of RFID that, when a circuit element is laminated on the back of a base material onto which bar codes, characters, etc., may be recorded, the surface of a thermal recording layer is roughened and generates print mackle, and it becomes difficult to read the printed bar code. Also, since a baggage tag is bent to be a loop shape when attached to baggage, the communication performance thereof may be deteriorated due to distortion of a circuit element, or the tag may become detached during transportation.

Accordingly, in consideration of the above situation, an object of the present invention is to provide a baggage tag which is substantially free from problems caused by defective recording due to print mackle, etc., and from deterioration of communication performance of a circuit element.

DISCLOSURE OF THE INVENTION

The inventor of the present invention, with diligent research to achieve the above object, found that problems due to defective recording can be prevented if a hard material is used as a base material for a baggage tag since the roughness generated due to the presence of a circuit element will not affect the surface of a recording paper.

The inventor of the present invention, on the other hand, found that the deterioration of communication performance due to distortion of a circuit element or the problem that a tag is detached can be prevented if a soft material is used as a base material for a baggage tag since excessive stress will not be applied to the circuit element when the baggage tag is bent into a loop shape.

The inventor of the present invention, after performing further diligent research, found that the above conflicting demands can be simultaneously satisfied if a laminate including a recording paper having particular strength and a plastic film is used as a base material under a condition of thickness (180–400 μm) which is normally required for a baggage tag.

That is, the baggage tag according to the present invention is a baggage tag including a laminate in which a recording paper and a plastic film are laminated, and a circuit element disposed on the plastic film side of the laminate, wherein the Clark degree of the laminate in the recording direction of the recording paper of the laminate, according to JIS P8143, is 50 to 200.

In the baggage tag, the laminate, an adhesive layer, and a backside protection sheet are laminated in that order, and the circuit element is held between the laminate and the backside protection sheet. It is preferable that at least a predetermined portion of the backside protection sheet be formed to be detachable.

Also, it is preferable that the recording paper include a paper layer and a contact type recording layer which is formed on the paper layer. It is preferable that the recording layer be a thermal recording layer.

Moreover, it is preferable that a protective layer be formed on the recording layer of the recording paper. It is also preferable that the protective layer include polyvinyl alcohol and/or colorant.

Furthermore, it is preferable that the plastic film be a polypropylene film.

Also, it is preferable that the recording paper and the plastic film be adhered to each other via a binder in the laminate. It is also preferable that the binder be a dry-laminate type binder.

Moreover, it is preferable that bar code recording be made on the recording paper.

Furthermore, it is preferable that recording be made on the recording paper and that at least a part of the recording be made in a portion superimposed with the circuit element viewed from the top of the tag In addition, a method for using the baggage tag according to the present invention is characterized by making the baggage tag in a loop shape, and attaching it to baggage.

BEST MODE FOR CARRYING OUT THE INVENTION

Figure 1:
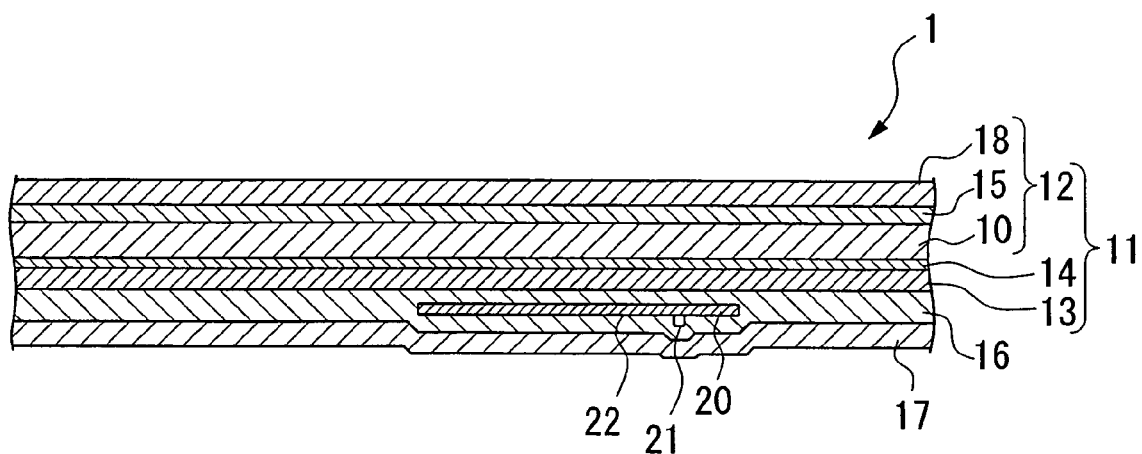
FIG. 1 is a diagram showing a cross-section of a tag for airline baggage according to an embodiment of the present invention.
Figure 2:
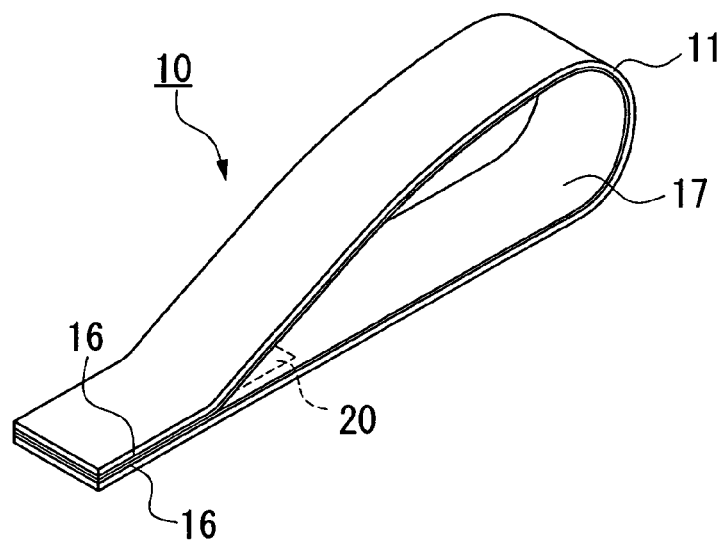
FIG. 2 is a diagram showing a perspective view of the tag for airline baggage when used.

A tag 1 for airline baggage shown in FIGS. 1 and 2 is generally configured by a laminate 11 in which a recording paper 12 and a plastic film 13 are laminated via a binder layer 14, a backside protection sheet 17 which is adhered to the plastic film 13 side of the laminate 11 via an adhesive layer 16, and a circuit element 20 which is embedded in the adhesive layer 16.

The recording paper 12 includes a paper layer 10, and a recording layer 15 and a protective layer 18 which are sequentially laminated on the surface of the paper layer 10. Note that a base coating layer may be disposed at a backside of the paper layer 10.

In the backside protection layer 17, at least a predetermined portion, such as both end portions, can be detached to expose the adhesive layer 16 so that, when used, the adhesive layer 16 at one end of the airline baggage tag 1, for instance, is exposed after the tag 1 is bent around a handle of the airline baggage so as to be in a loop shape, and it is adhered to an exposed adhesive layer 16 at the other end to be attached to the baggage. Also, it is possible to expose an adhesive layer 16 at one end and adhere it to the back of the backside protection sheet 17 at the other end so as to be attached to the baggage.

The size of the tag 1 for airline baggage may be suitably determined based on the size and number of baggage to which the tag 1 is attached, and is normally in the range of 200–600 mm×30–80 mm.

In the present invention, it is a significant characteristic that the recording paper 12 and the plastic film 13 are laminated to form the laminate 11. Although it is possible to position either of the recording paper 12 or the plastic film 13 at the adhesive layer side 16, it is preferable, in terms of ease of recording, that the paper 10 be located at the recording layer 15 side and the plastic film 13 be located at the adhesive layer 16 side so that the recording paper layer 12 may be positioned at the surface layer side.

Although the paper 10 used for the recording paper 12 of the laminate 11 can be any paper which is normally used for a laminate with a film, it is preferable to use, from the viewpoint of cost and migration from an adhesive layer, woodfree paper, thermal label base paper, label base paper, thermal base paper, coated paper, art paper, etc. Among them, use of the thermal label base paper is preferable.

The thickness of the paper 10 is preferably in the range of 30–150 µm, and more preferably in the range of 50–100 µm from the viewpoint of preventing print mackle. If the thickness is less than the above lower limit, the generation of print mackle cannot be prevented, and if the thickness is larger than the above upper limit, flexibility thereof will be lowered.

The recording paper 12 is not particularly limited as long as it has the recording layer 15, and it is possible to provide an undercoating layer and the protective layer 18 with the recording paper.

The recording layer 15 is used to register necessary information, and it is preferable to print information relating to baggage thereon to be displayed.

Examples of the recording layer 15 include a thermal recording layer, a recording layer for ink-jet printing, a recording layer for laser printing, a melt thermal transfer acceptor layer, and a sublimation transfer acceptor layer.

Among them, a thermal recording layer is preferably used because of its low cost, no need to prepare materials, such as ink, and ease of recording in practice.

Also, it is preferable that the thermal recording layer be a rewritable recording paper which is a reversible thermal recording layer since it becomes possible to renew display information.

If the recording layer 15 is a thermal recording layer, it is preferable to add ultraviolet ray absorbent, etc., to the protective layer 18 so that it becomes possible to retard discoloration and decolorization of the thermal recording layer.

The undercoating layer is a layer containing binder, etc., and it functions to improve smoothness, printing sensitivity by decreasing the affect of base paper, and adiabatic property.

Note that it is possible to print general information, such as the name and logo mark of airline company, in advance, on the surface of the recording layer 15 or the protective layer 18. Also, it is possible to print variable information relating to baggage, whenever it is necessary, using a printer, etc.

The plastic film 13 can be any base material having a suitable flexibility and a large tearing strength. For example, polyolefin resins (for example, a polypropylene resin, a polyethylene resin, etc.); polyester resins (for example, a polyester resin which is obtained by polymerizing polyethylene terephthalate or ethylene glycol, 1,4-cyclohexane dimethanol, and terephthalic acid, and in dialcohol residue in the polymer, the content of ethylene glycol residue and 1,4-cyclohexane dimethanol residue being 80–95 mol % and 5–20 mol %, respectively); a film including, as its main component, a resin, such as a polystyrene resin and a polyurethane resin; an expanded film having, as its main component, the above resins and including a blowing agent; and a porous film in which organic and/or inorganic colorant is added to the above resins and voids formed by a drawing process may be used. Examples of the porous film includes a porous polypropylene film having voids formed by a drawing process (a synthetic paper called "Yupo")

Among them, use of a polypropylene film is preferable which is excellent as a base material having a large tearing strength even if it is thin, has a large effect for assisting to prevent generation of print mackle of a recording layer, and is produced at low cost.

The thickness of the plastic film 13 is preferably in the range of 20–100 µm and more preferably in the range of 25–55 µm from the viewpoint of handling a tag, strength, and affect of print mackle of the recording layer 15. If the thickness is less than 20 µm, handling property as a tag will be deteriorated, and if the thickness is greater than 100 µm, its flexibility will be reduced and rigidity becomes too high. Accordingly, the adhesive layer 16 tends to peel off due to repellent force generated when it is bent.

The thickness of the binder layer 14 is about 3–30 µm. As a binder which forms the binder layer 14, use of dry-laminate type binder is preferable since no drying process is necessary after binding the paper 12 and the plastic film 13 which is required for a wet type binder, and it will not produce color during a manufacturing process of a tag for the case where the recording layer 15 is a thermal recording layer.

As the dry-laminate type binder, it is preferable that the binder per se be of a sheet shape, and a hotmelt binder of thermal pressing type is suitably used.

For example, one in which polyester, ethylene-vinyl acetate copolymer, polyamide or thermoplastic rubber is used as a base polymer, and tackifier, such as rosin, a rosin derivative, and a pinene resin, and a wax, such as polyethylene wax and paraffin wax, are added together with various plasticizers, fillers, thermostabilizers, etc., may be used.

Examples of polyester used herein include a copolymer of components selected from terephthalic acid, ethylene glycol, tetramethylene glycol, isophthalic acid, sebacic acid, dodecane acid, polytetramethylene ether glycol, and so forth. Examples of polyamide include a product obtained by polycondensation of a dimer acid and diamine. Examples of thermoplastic rubber include a block copolymer of polystyrene-polybutadiene-polystyrene.

Note that the binder used in the present invention is not limited to a dry-laminate type binder, and known binder, such as thermosetting binder, ultraviolet curable binder, two-pack curable binder, and electron beam curable binder may be used as long as pot life corresponding to a manufacturing process is obtained.

In the present invention, the thickness of the laminate 11 is preferably in the range of 70–200 µm, and more preferably in the range of 100–150 µm. If the thickness is less than the lower limit, it is not possible to prevent the generation of print mackle, and if the thickness is greater than the above limit, its flexibility will be lowered.

Also, it is necessary that the Clark degree of the laminate 11 in the recording direction of the recording paper 12, prescribed by JIS P8143, be in a range of 50 to 200, preferably 60–150. If the Clark degree is 50 or more, problems, such as accurate information cannot be read due to print mackle caused by the presence of the circuit element 20 located at the back of the laminate 11, will not be caused when displaying information of baggage, such as departure airport, arrival airport, and flight name, on the recording layer 15 of the tag 1 for airline baggage.

If the Clark degree is 200 or less, a sufficient flexibility can be imparted to the tag 1 for airline baggage, and hence adhered portion of the adhesive layer 16 and the backside protection sheet 17 will not peel off during transportation, or the tag 1 for airline baggage will not be broken due to bending when attached to airline baggage. Accordingly, there is no danger that the circuit element 20 will be damaged by the breakage of the tag for airline baggage.

The tag 1 for airline baggage according to the present invention has a suitable flexibility and strength as described above, and also has a large Elmendorf tear strength.

It is preferable that the Elmendorf tear strength of the tag 1 for airline baggage in the CD direction be 784 mN (80 g) or greater. The CD direction means a direction which is at a right angle to the direction of paper transferring along a paper machine.

When each of the Clark degree and Elmendorf tear strength is adjusted and the thickness thereof is reduced as described above, the adhesive layer 16 and the backside protection sheet 17 will not repel each other and hence the adhered portion thereof will not be detached when end portions of the tag 1 for airline baggage are adhered each other as shown in FIG. 2. Also, even if a force is applied in the longitudinal direction of the tag 1 for airline baggage, the tag 1 will not be torn off and detached from the baggage.

Note that it is difficult to prevent the generation of print mackle using only the plastic film 13, and it is not easy to satisfy the Elmendorf tear strength using only the recording paper 12.

The circuit element 20 usually includes a thin transceiver unit 22 which may be print-formed using conductive ink, for example, and a data storing unit 21 which has a larger thickness than the transceiver unit 22, and stores data and/or performs operation. The size of the circuit element 20 is not particularly limited; however, one having 50–500 μm thickness is normally used.

When used, a reader-writer connected to a computer is properly approached to the circuit element 20 of the tag 1 attached to airline baggage, and data is written and read via communication between the computer and the circuit element using weak radio waves of predetermined frequency.

Although the circuit element 20 is embedded in a part of the adhesive layer 16 in the embodiment shown in FIG. 1, the configuration thereof is not limited, and it is possible to dispose an electrostatic coupling type circuit element 20 which includes a transceiver unit formed by printing using conductive ink and a data storing unit and/or operation unit (IC chip), on the laminate 11 or the backside protection sheet 17. The configuration in which the circuit element 20 is disposed on the laminate 11 or the backside protection sheet 17 is preferable since the manufacturing cost thereof can be reduced.

Figure 3:
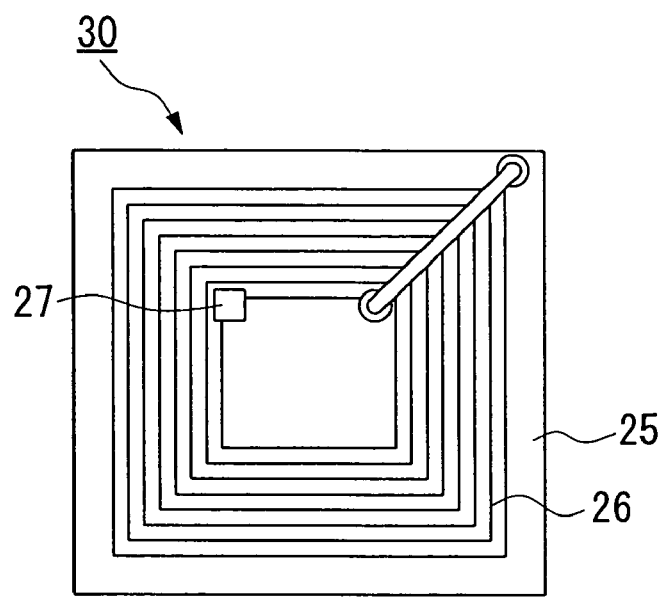
FIG. 3 is a diagram showing a plane view of an embodiment of a circuit element.

As the circuit element 20, various types thereof which are disclosed, for example, in Japanese Laid-Open Patent Application Nos. 2000-338874 and Hei 6-243358, may be used without any limitation. Concrete examples thereof include Tag inlet (V720-D52P01, I-CODE chip is used, a product of Omron Corporation) and an IC module which is practically used in IC cards. FIG. 3 shows an example of an IC module 30.

The IC module 30 includes a film shaped base plate 25 and an antenna coil 26 (the transceiver unit 22) which is formed on the base plate 25, and an IC chip 27 (the data storing unit 21) is disposed on one of the surfaces of the antenna coil 26. Both ends of the antenna coil 26 are electrically connected to the IC chip 27.

In an ID module using the antenna coil 26, an insulated base plate having a thickness of 20–100 μm made of a resin, such as polyethylene terephthalate, polypropylene, and polyethylene, may be used as the base plate 25. Examples of methods for forming the antenna coil 26 on the base plate 25 include a method in which a coil made of silver wire, copper wire, etc., is adhered, a method in which copper, aluminum, etc., is etched to have a coil shape, and a method in which a coil is printed using conductive ink, and so forth.

As for an ID module using a plate shape antenna, examples of methods for forming a plate shape antenna include a method in which printing, such as screen printing, is performed using conductive ink, etc., and a method in which a metal, such as copper and aluminum, is vapor deposited.

For the case where the above IC module is used, it is preferable that the surface roughened by IC chip 27, etc., be located at the backside protection sheet 17 side since affect of print mackle will be reduced and it will be further protected by the backside protection sheet 17.

As the IC chip 27, one having the length of about 0.2–10 mm and the thickness of about 50–300 μm is generally used. Note that recently proposed antenna integrated type chip, for example, a coil-on-chip in which an antenna coil is disposed on an IC chip having 0.02 mm square size, may also be used.

Moreover, the size of the circuit element 20 may be suitably adjusted in accordance with the size of the tag 1 for airline baggage, and the size is normally in the range of 10–150 mm×10–80 mm.

If the circuit element 20 is embedded in the adhesive layer 16 as shown in FIG. 1, it is preferable that the thickness of the whole adhesive layer 16 be in a range of 15–100 μm, and the thickness of the adhesive between the circuit element 20 and the backside protection sheet 17 is preferably in a range of 5–50 μm, and more preferably in a range of 7–30 μm.

As shown in FIG. 1, the data storing unit 21 in the circuit element 20 has a greater thickness than the transceiver unit 22, and hence the data storing unit 21 tends to be easily affected by impacts externally applied.

Accordingly, it is preferable that the circuit element 20 be disposed at the surface opposite the recording layer 15 of the laminate 11 so that the protruded data storing unit 21 closely contacts the adhesive layer 16 and is covered by the backside protection sheet 17.

In the above-mentioned manner, the data storing unit 21 which may be easily destroyed by an impact is protected by the surrounding adhesive layer 16 and the laminate 11, and the data storing unit 21 is hardly damaged or destroyed during printing or when it is used.

Also, print mackle is hardly generated when printing onto the recording layer 15.

For the case where the recording layer 15 is a thermal recording layer, a large print mackle prevention effect may be obtained by the above configuration since a heat source for recording is pressure welded to the recording layer 15 and it tends to cause print mackle.

Note that although the circuit element 20 can be placed at any position in the longitudinally direction of the tag 1 for airline baggage, it is preferable that the circuit element 20 be located in the vicinity of one end of the tag 1 for airline baggage.

That is, when printing on the recording layer 15 using a printer for airline baggage tag provided with a reader-writer, a printing operation is started after moving the thermal heat from an end of the tag 1 for airline baggage and at the same time confirming that an IC chip is active (i.e., in condition capable of transmitting/receiving, storing, and computing data). Accordingly, if the circuit element 20 is located in the vicinity of one end of the tag 1 for airline baggage where the printing operation is started, the confirmation can be made soon after the thermal head is moved.

Also, if the circuit element 20 is placed at the middle portion in the longitudinal direction of the tag 1 for airline baggage, the circuit element may be bent, depending on the type of the circuit element 20, when the tag is formed into a loop shape, and the communication may become impossible.

As shown in FIG. 2, it is preferable that the circuit element 20 be placed at a position where the adhesive layer 16 is not exposed since the circuit element 20 can be always held between the laminate 11 and the backside protection sheet 17 and the possibility of falling or breaking thereof is reduced.

If the circuit element 20 is disposed at an end portion of the tag 1 for airline baggage where the adhesive layer is exposed, both sides thereof is protected by the laminate 11 after the tag is attached to the baggage and the possibility that the circuit element 20 will fall or be broken is reduced since the circuit element will not be pressed or rubbed against a handle of the baggage.

If the circuit element 20 is disposed over a portion where the adhesive layer 16 is to be exposed and a portion where the adhesive layer 16 is not to be exposed, it will be difficult for the circuit element 20 to fall off since a part thereof is held between the laminate 11 and the backside protection sheet 17 when the backside protection sheet 17 is peeled off and the adhesive layer is exposed. Accordingly, it has substantially the same effect as being disposed at the exposed portion described above after being attached to the airline baggage.

Also, it is preferable that the data storing unit 21 be located at a position in the circuit element 20 apart from the end portion of the tag 1 for airline baggage. In this manner, when the tag 1 for airline baggage is formed into a loop shape and attached to baggage, it is unlikely that a strong impulse will be applied to the data storing unit 21 which will be properly protected by the baggage.

Moreover, it is possible to reinforce the circuit element 20.

Examples of the adhesive which forms the adhesive layer 16 are not particularly limited, and include rubber-, acrylic-, vinylether-, or urethane-, emulsion, solvent, and hotmelt adhesives. Also, permanent type, strong adhering type, frozen food type, or removable type adhesive may be used in accordance with its purpose. Among them, use of acrylic strong adhering type adhesive is preferable since it will not be separated during the transportation of baggage.

Also, it is possible to add an anticorrosive to the adhesive layer 16 so as to prevent corrosion of the transceiver unit 22 due to components of the adhesive which forms the adhesive layer 16. Examples of the anticorrosive include primary, secondary, tertiary amines, such as benzotriazole, tolyltriazole, and triethanol amine; alkali salts of organic acids, such as sodium benzoate; alkyl sulfonate, such as thiourea; esters, such as butyl benzoate; alkylsulfonate, such as oil sodium sulfonate; and anticorrosive colorant, such as pyrophosphate, tripolyphosphate, and metaphosphate.

Moreover, if a concealment agent is added to the adhesive layer 16 to impart concealing characteristics, it becomes possible to produce a tag 1 for airline baggage having high concealing characteristics by which the color of the backside protection sheet 17 can be hidden without affecting the appearance of a label even when the opacity of the laminate 11 is low. If the concealing characteristic of the tag for airline baggage is high, the location of the circuit element 20 is difficult to determine from the outside, and it becomes possible to prevent illegal conduct by camouflaging the circuit element 20. Examples of the concealment agent include colorants, such as aluminum powder, titanium oxide, carbon black, and non-conductive ink.

Furthermore, it is possible to add a tackifier, a cross-linking agent, colorant, and an ultraviolet absorbent, if necessary.

It is preferable that the backside protection sheet 17 have a suitable flexibility and thickness of about 10–200 μm. Film, such as polyethylene terephthalate, polyethylene, and polypropylene; high density paper, so-called polylami paper which may be produced by laminating a resin film of polyethylene, etc., onto high density paper, such as glassine paper, clay coating paper, Kraft paper, and woodfree paper; and a resin coating base paper in which a clearcole layer including water soluble polymer, such as polyvinyl alcohol and starch, and colorant as its main component, is provided with Kraft paper or woodfree paper, may be used as the backside protection sheet 17.

Among them, use of polypropylene and polyethylene, which are eco-friendly, is preferable, and use of inexpensive high-density paper, such as glassine paper, is more preferable.

Note that when the tag 1 for airline baggage is attached, both ends or either end of the adhesive layer 16 is exposed to be adhered as shown in FIG. 2, and the tag 1 is attached to, for example, a handle of baggage to be in a loop shape.

Accordingly, when used, the backside protection sheet 17 at a predetermined portion, such as both ends of the tag for airline baggage, needs to be peeled off so as to expose the adhesive layer 16. Therefore, it is preferable that a releasing agent layer be properly formed at least at the surface of the adhesive layer 16 side of the backside protection sheet 17 where the adhesive layer 16 is to be exposed. The releasing agent layer may be formed by applying emulsion type, solvent or non-solvent silicone resin, or fluorinated resin, and subjecting to a thermal curing, electron beam curing or ultraviolet curing process. The releasing agent layer may be formed over the entire surface of the backside protection sheet 17 or a part thereof including a predetermined portion to be released.

When the releasing agent layer is formed over the entire surface of the backside protection sheet 17, it is possible to provide an easily separatable portion by forming a nick or perforation on the backside protection sheet 17 corresponding to the boundary between a portion to expose the adhesive layer 16 and a portion not to expose the adhesive layer 16 so that a predetermined portion of the backside protection sheet 17 can be released from the separable portion.

When the releasing agent layer is formed only at a predetermined portion, it is also preferable to provide an easily separatable portion by forming a nick or perforation on the backside protection sheet 17 corresponding to the boundary between a portion to be separated (i.e., a portion on which the releasing agent layer is formed) and a portion not to be separated (i.e., a portion on which the releasing agent layer is not formed) so that a separated portion of the backside protection sheet 17 is easily removed after the backside protection sheet 17 is separated from the adhesive layer 16 at the predetermined portion.

It is preferable that the non-separated portion of the backside protection sheet 17 be firmly adhered to the adhesive layer 16.

Note that for the case where the circuit element 20 is provided with the backside protection sheet 17, the circuit element 20 is disposed at a portion of the backside protection sheet 17 which is not separated.

Also, although the adhesive layer 16 may be formed over the entire surface of the tag 1 for airline baggage, this is not necessary if the size thereof is in the range 10–100 mm×10–40 mm and the circuit element 20 is held by the adhesive layer 16 between the laminate 11 and the backside protection sheet 17.

The total thickness of the tag 1 for airline baggage is in the range of 180–400 μm.

In relation to the above thickness, it is preferable that the total thickness be in the range of 200–350 μm from the viewpoint of handling the tag for airline baggage.

Figure 4:
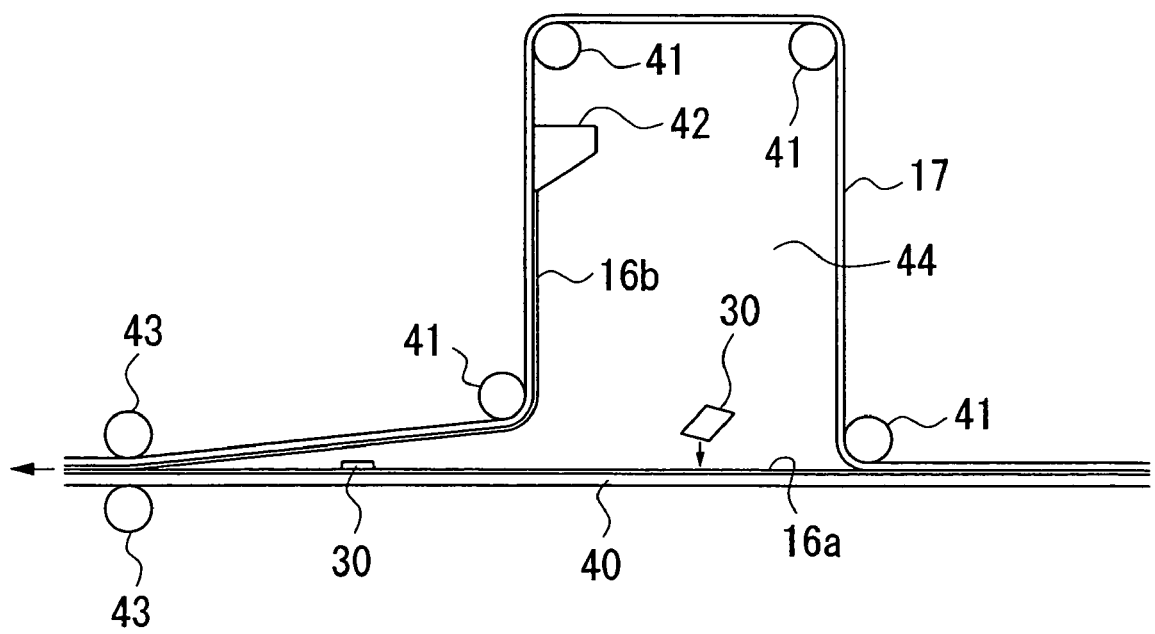
FIG. 4 is a diagram showing an embodiment of a method for manufacturing the tag for airline baggage.

An embodiment of manufacturing the above tag for airline baggage will be explained with reference to FIG. 4.

First, a recording layer in which a recording layer and a protecting layer are laminated on a sheet of paper, and a plastic film are bonded using a binder to form a base material of tape shape (laminate) 40. Then, a first adhesive layer 16*a* is formed on the plastic film side of the base material 40 of tape shape, and this is transferred as shown in FIG. 4.

On the other hand, the backside protection sheet 17 having the same width as the tape shape base material 40 is positioned above and transferred so as to be parallel to the tape shape base material 40. Note that that backside protection sheet 17 is uplifted by a group of rollers 41 so as to form an operation space 44 between the tape shape base material 40 and the backside protection sheet 17, and then is brought down to be closer, and transferred in parallel, to the tape shape base material 40.

When the backside protection sheet 17 is brought down, an adhesive is applied onto the tape shape base material 40 side of the backside protection sheet 17 using an adhesive applicator 42 so as to form a second adhesive layer 16*b*. The applicator 42 can be any applicator used for application, such as a blade coater, a curtain coater, and a lip coater. It is possible to carry out a drying process after the application, if necessary.

In the above operation space 44, IC modules 30 are placed on the tape shape base material 40 which is transferred with predetermined intervals so that an IC chip 27 faces the upward direction in the figure. The first adhesive layer 16*a* and the second adhesive layer 16*b* are integrated by pressing the tape shape base material 40 and the backside protection sheet 17, which are transferred close to each other, with the IC modules 30 therebetween using pressing rollers 43 and 43. In this manner, the adhesive layer 16 is formed and the IC modules 30 are embedded in the adhesive layer 16. After this, obtained material may be cut at a predetermined position to form the tag 1 for airline baggage.

As a use form, if the tag 1 is to be rolled, it is preferable to roll the tag gently since load applied to the chip may be reduced. Also, it is preferable to bent in a Z-shape since this would reduce load applied to the chip due to winding up.

If the scale of the manufacturing device of the tag for airline baggage is small, it is preferable to use a hot melt adhesive since the adhesive may be heated and softened using, for example, the adhesive applicator 42, at a required portion, such as a portion where the adhesive is applied, and hence the operability can be improved.

EXAMPLES

Hereinafter the present invention will be explained in detail with reference to examples; however, these examples are not intended to limit the present invention in any way.

In the following examples, "parts" and "%" mean "parts by mass" and "% by mass", respectively, unless otherwise so indicated.

The following evaluation was made for tags for airline baggage obtained in examples and comparative examples.

<Evaluation of Print Mackle>

A bar code printing process was performed on a thermal recording layer, which included a portion provided with a circuit element at the back thereof, of a tag for airline baggage using a printer for airline baggage tag (trade name of IER 512, a product of IER Co.), and ANSI standard inspection was performed using a bar code quality evaluation equipment (trade name: Laser Check II, a product of DATAMAX Co.).

A: (superb) reading was completed with only one scanning process;

B: (excellent) reading was completed normally with one scanning process but a re-scanning process was sometimes required;

C: (good) re-reading process was required more often than B but was appropriate for multi-scanning reading;

D: (acceptable) although appropriate for multi-scanning reading, it was not readable by all of the readers, and hence a matching test with the reader was required; and F: (no good) reading was impossible <Evaluation of Communication Ability>

One end of a tag for airline baggage including a circuit element was fixed, and the tag was bent 50 times at the angle 120 degrees in the right and left hand side directions by holding the other end of the tag. After this, a communication test was performed using an RF tag handy writer (trade name: RHT-100-01, a product of Welcat Co.). The number of communication trial was 10.

Example 1

(1) Manufacture of Circuit Element

A copper foil antenna circuit having a thickness of 35 μm was formed on a PET film of 40 μm thickness (trade name: UP2W, a product of Teijin Du Pont Co.) using an etching method.

Also, an IC chip (4 mm×4 mm, 100 μm thickness) provided with a connecting bump of 20 μm height was connected to a terminal of the above-mentioned antenna circuit using an oriented conduction film adhesive of 50 μm thickness (trade name: FC 161A, a product of Hitachi Chemical Co. Ltd.) to obtain a circuit element (hereinafter also referred to as an inlet).

(2) Preparation of Solutions A–D

The following components were mixed with stirring to obtain the solution A:

| | |
|---|---|
| calcined clay (oil absorbing amount: 110 ml/100 g) | 100 parts |
| 40% aqueous solution of sodium polyacrylate | 1 part |
| polyvinyl alcohol (10% aqueous solution) | 200 parts |
| water | 100 parts |

Note that calcined clay was ground until the average particle size thereof became 1.0 μm using a sand mill in the preparation of the solution A.

Also, the following components were mixed with stirring to obtain the solution B:

| | |
|---|---|
| 3-di-(n-butyl)amino-6-methyl-7-anilinofluorane | 10 parts |
| methyl cellulose (5% aqueous solution) | 5 parts |
| water | 40 parts |

Note that 3-di-(n-butyl)amino-6-methyl-7-anilinofluorane was ground until the average particle size thereof became 1.0 μm using a sand mill in the preparation of the solution B.

Also, the following components were mixed with stirring to obtain the solution C:

| | |
|---|---|
| 4-hydroxy-4'-isopropoxydiphenylsulfone | 30 parts |
| methyl cellulose (5% aqueous solution) | 5 parts |
| water | 80 parts |

Note that 4-hydroxy-4'-isopropoxydiphenylsulfone was ground until the average particle size thereof became 1.0 μm using a sand mill in the preparation of the solution C.

Also, the following components were mixed with stirring to obtain the solution D:

| | |
|---|---|
| 1,2-di(3-methylphenoxy)ethane | 20 parts |
| methyl cellulose (5% aqueous solution) | 5 parts |
| water | 80 parts |

Note that 1,2-di(3-methylphenoxy)ethane was ground until the average particle size thereof became 1.0 μm using a sand mill in the preparation of the solution D.

(3) Manufacture of Thermal Recording Paper

The solution A was applied on one surface of a woodfree paper of 80 μm thickness (trade name: KWF 70, a product of Oji Paper Co., Ltd.) so that the application amount after drying was 9 g/m². After being dried, a smoothing process was performed using a super calender to form an intermediate layer. Then, a solution for thermal recording layer, which was obtained by mixing with stirring 55 parts of the solution B, 115 parts of the solution C, 80 parts of the solution D, 160 parts of 10% polyvinyl alcohol aqueous solution, 20 parts of 50% SBR latex, and 17 parts of calcium carbonate, was applied on the intermediate layer so that the application amount after being dried becomes 6 g/m². After drying, a thermal recording layer was formed. Then, a solution for protection layer, which was obtained by mixing with stirring 250 parts of 10% aqueous solution of acetoacetyl group modified polyvinyl alcohol, 70 parts of kaolin (trade name: UW-90, a product of EMC Co.), 6 parts of 30% aqueous dispersion of zinc stearate, and 150 parts of water, was applied on the thermal recording layer so that the application amount after being dried becomes 5 g/m². After drying, a smoothing process was performed using a super calender to form a protection layer, and a thermal recording paper of 100 μm thickness was obtained.

(4) Manufacture of Laminate

Then, a binder layer was formed by applying polyurethane binder (trade name: BHS-6020A, a product of Toyo Morton Co.) on a biaxial oriented polypropylene film of 40 μm thickness (trade name: SD-101, a product of Oji Paper Co., Ltd.) so that the application amount of solid components becomes 3 g/m². After this, the binder layer was bound to a surface of the thermal recording paper, which is opposite the surface thereof having the thermal recording layer, to obtain a laminate in which the thermal recording paper and the polypropylene film were laminated. The Clark degree of the obtained laminate in the recording direction of the recording paper, prescribed by JIS P8143, was 75.

(5) Manufacture of Tag for Airline Baggage

A releasing sheet was obtained by applying a composition including 100 parts of a solvent type silicone releasing agent (trade name: LTC-300B, a product of Toray Dow Corning Co.), and 0.8 part of catalyst (trade name: SRX-212, a product of Toray Dow Corning Co.) onto a glassine paper (trade name: White glassine 64, a product of Oji Paper Co., Ltd.) so that the drying weight becomes 1.0 g/m², and heat curing it. Then, an adhesive (trade name: SVP101, a product of Saiden Chemical Co.) was applied on the releasing sheet so that the application amount after drying becomes 17 μm, and the adhesive was applied on the side opposite the thermal recording layer of the laminate using a transfer application method. After this, while peeling off the releasing sheet, a circuit element was placed on the adhesive layer so that the antenna circuit and the IC chip were located opposite the laminate with a base plate therebetween. Then, the above adhesive was applied onto a portion of the peeled releasing sheet which was to be adhered to at least the above circuit element so that the application amount after drying becomes 17 g/m, and this was adhered again to the laminate including the circuit element to obtain a tag for airline baggage.

Also, perforation was made in order to easily separate the tag for airline baggage one by one, and the boundary was half-cut in order to easily separate at least one end of the backside protection sheet.

The tear strength, prescribed by JIS P-8116, of the obtained tag for airline baggage in the CD direction measured by an Elmendorf tear strength measuring device (a product of Tozai Seiki Co.) was 980 mN (100 g).

The result of the print mackle evaluation was ranked A, and a required printing quality was obtained without the generation of any print mackle.

Also, the result of the communication ability evaluation was 10/10 (no. of success/attempts), and hence it had excellent communication ability.

Example 2

A laminate was manufactured in the same manner as in Example 1 except that a synthesized polypropylene paper of 80 μm thickness (trade name: Yupo CFG80, a product of Yupo Corporation) was used instead of the polypropylene film of 40 μm thickness. The Clark degree of the laminate in the recording direction of the recording paper was 60.

Using the same method as in Example 1 except that the above laminate was used, a tag for airline baggage having an IC chip between the laminate and the backside protection sheet was obtained. The Elmendorf tear strength of the tag for airline baggage in the CD direction was 835 mN (85 g). When the print test was performed on the obtained tag for airline baggage, the evaluation result was ranked A, and a required printing quality was obtained without generating any print mackle. Also, as for the communication ability test, a result of 10 out of 10 was obtained, and hence it showed an excellent communication ability.

Comparative Example 1

The solution A was applied onto one surface of a woodfree paper of 150 μm thickness (trade name: KWF 135, a product of Oji Paper Co., Ltd.), dried, and subjected to a smoothing process in the same manner as in Example 1 to form an intermediated layer.

The same liquid for thermal recording layer used in Example 1 was applied and dried to form a thermal recording layer.

Then, the same liquid for protection layer used in Example 1 was applied, dried, and subjected to a smoothing process to form a protection layer. In this manner, a laminate formed by a woodfree paper including a thermal recording layer was obtained.

The Clark degree of the thermal recording paper including the protection layer in the recording direction of the recording layer was 40.

An adhesive (trade name: SVP101, a product of Saiden Chemical Co.) was applied onto a releasing sheet so that the application amount after drying was 17 g/m², and the adhesive was applied on the side opposite the thermal recording layer of the laminate using a transfer application method. Then, while peeling off the releasing sheet, a circuit element was placed on the adhesive layer so that the antenna circuit and the IC chip were located opposite the laminate with a base plate therebetween. After this, the adhesive was applied onto the circuit element, and the backside protection sheet was attached on the adhesive to obtain a tag for airline baggage.

The Elmendorf tear strength of the obtained tag for airline baggage in the CD direction measured in the same manner as in Example 1 was 392 mN (40 g).

When a print mackle evaluation was made on the obtained tag for airline baggage, print mackle was generated where the IC chip was placed, and it was ranked at F which indicates an insufficient print quality.

Also, since the tear strength of the thermal recording paper (which corresponds to the laminate of the present invention) was not sufficient, the obtained tag for airline baggage may be separated during transportation.

Comparative Example 2

A tag for airline baggage was obtained in the same manner as in Example 1 except that a thermal paper made of a synthetic polypropylene paper of 95 µm thickness (trade name: FPG 95, a product of Yupo Corporation) on which a thermal layer and a protection layer were provided was used instead of the laminate made of the thermal paper and the polypropylene film. The Elmendorf tear strength of the tag for airline baggage including the synthetic paper in the CD direction was 490 mN (50 g).

Also, the Clark degree of the synthetic polypropylene paper including the thermal recording layer in the recording direction of the recording paper was 30.

When a print test was performed on the obtained tag for airline baggage, print mackle was generated where the IC chip was placed, and the tag was ranked F which indicates an insufficient print quality.

Also, since the tear strength of the synthetic polypropylene paper (which corresponds to the laminate of the present invention) was not sufficient, the obtained tag for airline baggage may be separated during transportation.

Comparative Example 3

A synthetic paper including a thermal recording layer on one of the surfaces thereof was obtained in the same manner as in Example 1 except that a synthetic polypropylene paper of 60 µm thickness (trade name: Yupo FPG 95, a product of Yupo Corporation) was used instead of the polypropylene film of 40 µm thickness. The Clark degree of the synthetic paper including the thermal recording layer in the recording direction of the recording paper was 40.

A tag for airline baggage including an IC chip between the synthetic paper and the backside protection sheet was obtained in the same manner as in Example 1 except that the above synthetic paper was used instead of the laminate. The Elmendorf tear strength of the tag for airline baggage in the CD direction was 637 mN (65 g).

When a print test was performed on the obtained tag for airline baggage, print mackle was generated where the IC chip was placed, and the tag was ranked F which indicates an insufficient print quality.

Also, since the tear strength of the synthetic paper was not sufficient, the obtained tag for airline baggage may be separated during transportation.

Comparative Example 4

A tag for airline baggage was obtained in the same manner as in Example 1 except that a woodfree paper of 105 µm thickness (trade name: KWF 90, a product of Oji Paper Co., Ltd.) was used instead of the woodfree paper of 80 µm thickness and that a PET film of 50 µm thickness (trade name: UP2W, a product of Teijin Du Pont Co.) was used instead of the polypropylene film of 40 µm thickness. The Clark degree of the laminate formed by the woodfree paper provided with the thermal recording layer and the PET film in the recording direction of the recording paper was 210.

The Elmendorf tear strength of the tag for airline baggage in the CD direction was 1470 mN (150 g). The tag for airline baggage had a low flexibility, and when attached to a handle of a baggage, the adhered portion of the tag was easily separated.

When a print test was performed on the obtained tag for airline baggage, a required print quality was obtained without any print mackle. However, since the flexibility of the tag was low, the obtained tag may be separated during transportation.

Examples 3–7, Comparative Examples 5 and 6

(1) Manufacture of Laminate

A laminate was formed in the same manner as in Example. 1 except that the type of paper described in the thermal paper section in Table 1 (upper: type of paper; middle: thickness of paper; and lower: thickness of paper after being provided with an undercoating layer, a thermal layer, and a protection layer) and the film described in Table 1 (upper: type; and lower: thickness) were used and bound using a binder (the same binder as in Example 1) of an amount (upper: application amount; and lower: thickness) described in the binding layer section in Table 1. The Clark degree of each of the obtained laminate in the recording direction of the recording layer was shown in Table 1.

(2) Manufacture of Tag for Airline Baggage

A tag for airline baggage of 250 µm thickness was produced in the same manner as in Example 1 except that the above-mentioned laminate, a base material of release sheet (in the release paper section, upper: type and lower: thickness) described in Table 1, and the adhesive described in the adhesive layer section (the same adhesive as in Example 1) in Table 1 were used. Results of print mackle test and communication ability test of the each of the tag for airline baggage are shown in Table 1.

TABLE 1

| | (250 µm thickness) | | | |
| --- | --- | --- | --- | --- |
| | Clark degree | Print mackle (ANSI Grade) | Communication (succeeded/attempt) | Thermal paper |
| Ex. 3 | 50 | Δ (C) | ○ (10/10) | KWF70 80 µm 100 µm |
| Ex. 4 | 60 | Δ (C) | ○ (10/10) | KWF70 80 µm 100 µm |
| Ex. 5 | 100 | ○ (B) | ○ (10/10) | KWF70 80 µm 100 µm |
| Ex. 6 | 150 | ○ (A) | ○ (8/10) | KWF70 80 µm 100 µm |

TABLE 1-continued (250 μm thickness)

| | | | | |
|---|---|---|---|---|
| Ex. 7 | 190 | ○ (A) | Δ (7/10) | KWF70 80 μm 100 μm |
| Comparative Ex. 5 | 40 | X (F) | ○ (10/10) | YupoFPG80 800 μm 100 μm |
| Comparative Ex. 6 | 210 | ○ (A) | X (3/10) | WF55 60 μm 80 μm |

| | Binding layer | Film | Adhesive layer | Release paper |
|---|---|---|---|---|
| Ex. 3 | 4 g 4 μm | Yupo SGS60 60 μm | 25 g 25 μm | Yupo SGS60 61 μm |
| Ex. 4 | 4 g 4 μm | Yupo SGS60 60 μm | 21 g 21 μm | White glassine 64 65 μm |
| Ex. 5 | 3 g 3 μm | OPP 40 40 μm | 17 g 17 μm | OK White 90 90 μm |
| Ex. 6 | 3 g 3 μm | Lumilar #38 38 μm | 19 g 19 μm | OK White 90 90 μm |
| Ex. 7 | 4 g 4 μm | Lumilar #50 50 μm | 21 g 21 μm | White glassine 73 75 μm |
| Comparative Ex. 5 | 4 g 4 μm | Yupo SGS60 60 μm | 25 g 25 μm | Yupo SGS60 61 μm |
| Comparative Ex. 6 | 4 g 4 μm | Dialami #70 70 μm | 21 g 21 μm | White glassine 73 75 μm |

In Table 1:
KWF70: trade name, woodfree paper, a product of Oji Paper Co., Ltd.
Yupo FPG80: trade name, synthetic polypropylene paper, a product of Yupo Corporation.
Yupo SGS60: trade name, synthetic polypropylene paper, a product of Yupo Corporation.
WF55: trade name, woodfree paper, a product of Oji Paper Co., Ltd.
OPP40: biaxial oriented polypropylene film (trade name: SD-101, a product of Oji Paper Co., Ltd.)
Lumilar #38, #50: trade name, polyester film, a product of Toray Dow Corning Co.
Dialami #70: trade name, polyester film, a product of Mitsubishi Plastics Inc.
OK White: trade name, glassine paper, a product of Oji Paper Co., Ltd.

Examples 8–10, Comparative Example 7

(1) Manufacture of Laminate

A laminate was formed in the same manner as in Example 1 except that the type of paper described in the thermal paper section in Table 2 (upper: type of paper; middle: thickness of paper; and lower: thickness of paper after being provided with an undercoating layer, a thermal layer, and a protection layer) and the film described in Table 2 (upper: type; and lower: thickness) were used and bound using a binder (the same binder as in Example 1) of an amount (upper: application amount; and lower: thickness) described in the binding layer section in Table 2. The Clark degree of each of the obtained laminate in the recording direction of the recording layer is shown in Table 2.

(2) Manufacture of Tag for Airline Baggage

A tag for airline baggage of 180 μm thickness was produced in the same manner as in Example 1 except that the above-mentioned laminate, a base material of release sheet (in the release paper section, upper: type and lower: thickness) described in Table 2, and the adhesive described in the adhesive layer section (the same adhesive as in Example 1) in Table 2 were used. Results of print mackle test and communication ability test of the each of the tags for airline baggage are shown in Table 2.

TABLE 2

(180 μm thickness)

| | Clark degree | Print mackle (ANSI Grade) | Communication (succeeded/attempt) | Thermal paper |
|---|---|---|---|---|
| Ex. 8 | 50 | Δ (C) | ○ (10/10) | WF45 50 μm 70 μm |
| Ex. 9 | 60 | Δ (C) | ○ (10/10) | WF45 50 μm 70 μm |
| Ex. 10 | 100 | Δ (C) | ○ (10/10) | WF45 50 μm 70 μm |
| Comparative Ex. 7 | 40 | X (F) | ○ (10/10) | Yupo SGS60 60 μm 80 μm |

| | Binding layer | Film | Adhesive layer | Release paper |
|---|---|---|---|---|
| Ex. 8 | 2 g 2 μm | TCS #40 40 μm | 15 g 15 μm | OET 50 53 μm |
| Ex. 9 | 2 g 2 μm | OPP 40 40 μm | 15 g 15 μm | OET 50 53 μm |
| Ex. 10 | 2 g 2 μm | Lumilar #38 38 μm | 14 g 14 μm | White glassine 55 56 μm |
| Comparative Ex. 7 | 2 g 2 μm | TNF #30 30 μm | 15 g 15 μm | OET 50 53 μm |

In Table 2:
WF45: trade name, woodfree paper, a product of Oji Paper Co., Ltd.
TCS #40: trade name, LLDPE (linear low density polyethylene) film, a product of Tohcello Co., Ltd.
TNF #30: trade name, LLDPE film film, a product of Tohcello Co., Ltd.
The same symbols as in TABLE 1 indicate the same content.

Examples 11–13, Comparative Example 8

(1) Manufacture of Laminate

A laminate was formed in the same manner as in Example 1 except that the type of paper described in the thermal paper section in Table 3 (upper: type of paper; middle: thickness of paper; and lower: thickness of paper after being provided with an undercoating layer, a thermal layer, and a protection layer) and the film described in Table 3 (upper: type; and lower: thickness) were used and bound using a binder (the same binder as in Example 1) of an amount (upper: application amount; and lower: thickness) described in the binding layer section in Table 3. The Clark degree of each of the obtained laminate in the recording direction of the recording layer is shown in Table 3.

(2) Manufacture of Tag for Airline Baggage

A tag for airline baggage of 350 μm thickness was produced in the same manner as in Example 1 except that the above-mentioned laminate, a base material of release sheet (in the release paper section, upper: type and lower: thickness) described in Table 3, and the adhesive described in the adhesive layer section (the same adhesive as in Example 1) in Table 3 were used. Results of print mackle test and communication ability test of the each of the tag for airline baggage are shown in Table 3.

TABLE 3

(350 μm thickness)

| | Clark degree | Print mackle (ANSI Grade) | Communication (succeeded/attempt) | Thermal paper |
|---|---|---|---|---|
| Ex. 11 | 100 | ○ (A) | ○ (8/10) | KWF135 150 μm 170 μm |
| Ex. 12 | 150 | ○ (A) | Δ (7/10) | KWF135 150 μm 170 μm |
| Ex. 13 | 200 | ○ (A) | Δ (6/10) | KWF135 150 μm 170 μm |
| Comparative Ex. 8 | 220 | ○ (A) | X (1/10) | KWF135 150 μm 170 μm |

| | Binding layer | Film | Adhesive layer | Release paper |
|---|---|---|---|---|
| Ex. 11 | 5 g 5 μm | OPP 60 60 μm | 25 g 25 μm | OK White 90 90 μm |
| Ex. 12 | 5 g 5 μm | OPP 60 60 μm | 25 g 25 μm | OK White 90 90 μm |
| Ex. 13 | 10 g 10 μm | Lumilar #50 50 μm | 30 g 30 μm | OL White 90 90 μm |
| Comparative Ex. 8 | 5 g 5 μm | Dialami #70 70 μm | 30 g 30 μm | White glassine 73 75 μm |

In Table 3:
OET150: trade name, resin coating release paper, a product of Oji Paper Co., Ltd.
KWF135: trade name, woodfree paper, a product of Oji Paper Co., Ltd.
The same symbols as in Table 1 indicate the same content.

It is obvious from Examples 1 and 2 and Comparative Examples 1–4 that the tags of Comparative Examples in which only woodfree paper or synthetic paper, or a laminate of a woodfree paper and a synthetic paper were used, showed insufficient print quality by generating print mackle and the tear strength thereof were also low. The tags of Examples, on the other hand, showed no print mackle and the tear strength thereof were high.

As is obvious from Tables 1, 2, and 3, Comparative Examples in which the Clark degree was lower than 50 cannot be practically used due to print mackle, and Comparative Examples in which the Clark degree exceeded 200 had insufficient flexibility which caused defective communication property. On the other hand, the tags for airline baggage of each Example of the present invention showed excellent ANSI inspection results and communication ability.

INDUSTRIAL APPLICABILITY

As explained above, the baggage tags according to the present invention do not generate print mackle caused by a rough surface of a recording layer due to the presence of a circuit element. Accordingly, it becomes possible to clearly print information of baggage, and also it will not be separated from the baggage during transportation, etc.

Moreover, in a baggage tag in which a laminate having a recording layer formed on one of the surfaces, an adhesive layer, and a backside protection sheet are laminated in this order, and the adhesive layer faces the surface opposite the surface of the laminate having the recording layer wherein the circuit element is embedded in a part of the adhesive layer or is disposed at a part of the laminate or the surface of the backside protection sheet at the adhesive layer side, a storing element is strongly held between the laminate and the backside protection sheet, or between the two laminates which are adhered via an adhesive layer. Accordingly, the circuit element will not be separated.

As explained above, a baggage tag having excellent practicablity is obtained according to the present invention.

The tag is excellent, in particular, as a tag for airline baggage.

The invention claimed is:

1. A baggage tag for airline baggage, comprising: a laminate in which a recording paper and a plastic film are laminated; and a circuit element disposed at the plastic film side of the laminate, wherein
   the laminate, an adhesive layer, and a backside protection sheet are laminated in this order,
   the circuit element is held between the laminate and the backside protection sheet, the circuit element being covered by the adhesive layer,
   at least a predetermined portion of the backside protection sheet is made peelable, and
   the Clark degree of the laminate in a recording direction of the recording paper, prescribed by JIS P8143, is 50–200.

2. A baggage tag according to claim 1, wherein the recording paper includes a paper layer, and a contact-record type recording layer which is formed on the paper layer.

3. A baggage tag according to claim 2, wherein the recording layer is a thermal recording layer.

4. A baggage tag according to claim 2, wherein a protection layer is provided on the recording layer.

5. A baggage tag according to claim 4, wherein the protective layer includes polyvinyl alcohol and/or colorant.

6. A baggage tag according to claim 1, wherein the plastic film is a polypropylene film.

7. A baggage tag according to claim 1, wherein the recording paper and the plastic film of the laminate are bonded to each other via a binder.

8. A baggage tag according to claim 7, wherein the binder is a dry-laminate type binder.

9. A baggage tag according to claim 1, wherein bar code recording is made on the recording paper.

10. A baggage tag according to claim 1, wherein record is made on the recording paper, and at least a part of the recording is made in a portion superimposed with the circuit element viewed from the top of the tag.

11. A method for using the baggage tag of claim 1, comprising the step of: making the tag in a loop shape to attach to a baggage.

12. A baggage tag according to claim 1, wherein the Clark degrees of the laminate in a recording direction of the recording paper, prescribed by JIS P8143, is 50–150.

* * * * *